United States Patent [19]

Wächter

[11] Patent Number: 5,306,451
[45] Date of Patent: Apr. 26, 1994

[54] METHOD FOR THE PRODUCTION OF REFRACTORY BRICKS

[75] Inventor: Klaus Wächter, Kaarst, Fed. Rep. of Germany

[73] Assignee: DYKO Industriekeramik GmbH, Dusseldorf, Fed. Rep. of Germany

[21] Appl. No.: 981,616

[22] Filed: Nov. 25, 1992

[30] Foreign Application Priority Data

Dec. 7, 1991 [DE] Fed. Rep. of Germany ....... 4140417

[51] Int. Cl.$^5$ ............................................. C04B 35/12
[52] U.S. Cl. ........................................ 264/65; 264/66; 501/132
[58] Field of Search ............... 264/65, 66; 501/132

[56] References Cited

U.S. PATENT DOCUMENTS 5,024,793  6/1991  Wilkening .

FOREIGN PATENT DOCUMENTS 60-239355  11/1985  Japan ..................................... 501/132
0833870    5/1981   U.S.S.R. ............................... 501/132

OTHER PUBLICATIONS

Specification of Japanese Patent Application SHO5-9-94526.
"Low Density and Low Thermal Conductivity Chrome Oxide Refractories for Glass-Melting Furnaces for Fiber Production", 1981.
"Properties of Chromic Oxide Refractories", Mar. 1977.

Primary Examiner—James Derrington
Attorney, Agent, or Firm—Hopkins & Thomas

[57] ABSTRACT

A method for the production of refractory bricks, major components of which are a high proportion of chromium oxide and a small proportion of titanium oxide, makes provision for the chromium oxide and titanium oxide to be mixed, moulded and fired in a reducing atmosphere in order to achieve a solid solution of the titanium oxide in the chromium oxide. The fired intermediate units are then crushed. Other units are then formed from the sieve fractions of the crushed intermediate units and these are fired in a second firing operation to produce the refractory bricks. Non-fired chromium oxide is added to the sieve fractions of the crushed intermediate units and mixed in with this. The other units which are to be reductive-fired in the second firing operation are formed from this mixture.

11 Claims, No Drawings

METHOD FOR THE PRODUCTION OF REFRACTORY BRICKS

FIELD OF THE INVENTION

The invention refers to a method for the production of refractory bricks, a major component contained in which is a high proportion of chromium oxide and a small proportion of titanium oxide, whereby the chromium oxide and titanium oxide are mixed, moulded and fired in a reducing atmosphere in order to achieve a solid solution of the titanium oxide in the chromium oxide, whereupon the fired intermediate units are crushed and other units are formed from the sieve fractions of the crushed intermediate units which are then fired in a second firing operation to produce the refractory bricks. Refractory-quality, porous chromium oxide bricks can be produced according to the method.

BACKGROUND OF THE INVENTION

A method of the type described above is known from the Japanese patent application Sho-59-94526. In this, 95.0 to 99.5% by weight chromium oxide powder is mixed with 5.0 to 0.5% by weight titanium oxide powder. Intermediate units are formed from this mixture and fired in a first firing operation. The firing is carried out in a reducing atmosphere in order to achieve a solid solution of the titanium oxide in the chromium oxide. The fired intermediate units are subsequently crushed by mechanical means, i.e. ground actually. The ground material is measured into sieve fractions which are are then recombined according to the batch composition. The units which are to be subjected to firing in a second firing operation are then formed from this material. The second firing operation is carried out in an oxidizing atmosphere. Good mixing of the chromium oxide powder with the titanium oxide powder can be achieved through spray drying. This known two-stage production technique has the advantage that refractory bricks are available after the second firing operation and that said bricks exhibit relatively little firing shrinkage. However, this firing shrinkage is still more than 1% and is in fact in the order of magnitude of 1.2 to 2.8%. Another advantage is that a good microstructure results in which the titanium oxide is dissolved in the chromium oxide. A disadvantage is the particularly expensive production involved in the two-stage firing procedure, whereby all 100% of the raw materials needs to be fed through the first and also through the second firing operation. The spalling resistance of the refractory bricks produced is only good in certain circumstances. Cracks in the bricks do appear at the first chill test. If, however, bricks were to be manufactured from porous material, then the spalling resistance would be better. In the second firing operation, which takes place in an oxidizing atmosphere, there results not only the bridging over the titanium oxide with the advantageous microstructures described, but also a certain proportion of hexavalent chromium oxide which is harmful to health. This proportion is particularly high when firing in the temperature range between 1200° and 1600° C. which, however, cannot be avoided because of the microstructure.

A production method for dense chromium oxide bricks is known from the publication "Properties of the Chromic Oxide Refractories", Kainarskii & Degtyarva, Ogneupory, No. 3, pp. 36–41, March 1977 in which the moulded raw materials are fired in a single-stage firing operation in a reducing atmosphere. During this sintering takes place. This method is particularly cost-effective because the firing costs are only incurred once. Bricks with a higher apparent density can be produced which also exhibit a low open porosity. Such bricks possess particulary high corrosion resistance with regard to molton glass. A disadvantage with this method is the high firing shrinkage which lies in the order of magnitude of 10 to 15%. The spalling resistance is also comparatively poor. As a result of its density, the material exhibits a relatively high thermal conductivity so that its use in the construction of kilns demands special insulation measures.

Furthermore, a production method for porous bricks with low density, improved spalling resistance and low thermal conductivity is known from "Low Density and Low Thermal Conductivity Chrome Oxide Refractories for Glass-Melting Furnaces for Fiber Production", Krivoruchko et al, Ogneupory, No. 4, pp. 45–49, April 1981 in which the material is fired in a single-stage firing operation in an oxidizing atmosphere in conjunction with an opening material. This opening material leaves behind cavities, thus increasing the porosity so that, advantageously, bricks with low density and high porosity can be manufactured. Owing to the low specific weight, these bricks are also advantageous in terms of material consumption. However, they cannot be used in direct contact with the molton glass because the porous bricks do not provide enough resistance to the glass.

DETAILED DESCRIPTION

It is the object of the invention to make available a method of the type described above in which refractory bricks can be produced with advantageously low firing shrinkage and a good microstructure. Essential in this case is the cementing of the individual chromium dioxide crystals (grains) to each other with a continuous bridging together.

According to the invention, this is achieved with a method of the type described above in that the sieved fractions of crushed intermediate units are mixed with non-fired chromium oxide, other units are formed from this mixture and these are then reductive-fired in the second firing operation. Hence, a porous chromium oxide material or refractory bricks respectively result from such a material, whereby an 18 to 20% open pore ratio can be achieved. The bricks have a low firing shrinkage which lies below 1%. The bricks have a low thermal conductivity and increased gas permeability. The corrosion resistance with regard to molton glass is sufficiently good. Surprisingly, although the bricks produced in this way are porous, they can be employed in direct contact with the glass. Owing to the influence of temperature in the area of the molton glass and the atmosphere above the molton glass, a material transport occurs from the side in contact with the glass into the interior of the brick so that the porosity is closed up at this point. The spalling resistance which can thus be attained is better than with dense chromium oxide bricks. Only a very low proportion of hexavalent chromium oxide results here because the chromium oxide is protected against the admission of oxygen by the reducing atmosphere. Another advantage of this new method can be seen in that only some of the material needs to be fed through both firing stages. As both firing operations are of the reductive type, it is possible to charge one single kiln fire with material which is subjected to the first firing cycle at the same time as material which is subjected to the second firing cycle. Moreover, it is an advantageous possibility that broken pieces of chromium oxide bricks and/or chromium oxide bricks which were in contact with glass could be processed.

Non-fired titanium oxide can also be added to the sieve fractions of crushed intermediate units so that here too, non-fired chromium oxide and non-fired titanium oxide can be combined with the crushed material from the intermediate units. This additional material which is introduced is essentially responsible for the bridging between the grains of the crushed intermediate units. The non-fired chromium oxide and, if applicable, titanium oxide can be added to the sieve fractions of crushed, fired intermediate units in the proportion of approximately 10 to 20% by weight. Therefore, at any rate, a proportion of approximately 10 to 20% by weight is only subjected to one firing operation.

The crushed intermediate units can be put into the kiln in sieve fractions of up to 0.5 mm, 0.5 to 1.0 mm and 1.0 to 4.0 mm so that a defined crystal classification is present. This is important for the build-up of the microstructure.

The crushed intermediate units can be put into the kiln in proportions of from 15 to 30% by weight for a sieve fraction of up to 0.5 mm, from 15 to 30% by weight for a sieve fraction of 0.5 to 1.0 mm, and from 20 to 60% by weight for a sieve fraction of 1.0 to 4.0 mm. These figures are related to the total contents.

The chromium oxide can be mixed in a proportion of approximately 96% by weight with the titanium oxide in a proportion of approximately 4% by weight prior to the first firing. Non-fired chromium oxide and titanium oxide are added to the sieve fractions of the crushed intermediate units in roughly the same ratio. Hence, the percentage-based composition of the refractory bricks is not altered.

In this case, the second firing operation can be carried out under an oxidizing atmosphere during part of the heating-up, then under a reducing atmosphere while maintaining the temperature and under an oxidizing atmosphere during the cooling-down. It is important that, above all, to continue reductive-firing while maintaining the temperature, i.e. up until the time at which the sintering process, essential for the build-up of the microstructure, is finished.

The invention will be further explained and described by means of some embodiment examples, whereby the main facts are summarized in the following table:

|  |  | 1 | 2 | 3 | 4 |
|---|---|---|---|---|---|
| $Cr_2O_3$ IU* |  |  |  |  |  |
| 1–4 mm | % | 30 | 30 | 35 | — |
| 0.5–1 mm | % | 25 | 25 | 25 | — |
| 0–0.5 mm | % | 35 | 25 | 20 | — |
| $Cr_2O_3$ | % | 10 | 19 | 14 | 96 |
| $TiO_2$ (rutile) | % | — | 1 | 1 | 4 |
| Firing shrinkage | % | 0.5 | 1 | 0.8 | 15 |
| Open porosity | % | 19.3 | 17.9 | 18.5 | ≦5 |
| Cold compression strength | MPa | 70 | 110 | 100 | >300 |
| Spalling resistance (air quenching, No. of quenchings) |  | 10 | 5 | 8 | 1 |

*IU = Intermediate Units

In embodiment example No. 1 merely 10% chromium oxide in pigment quality as non-fired material was added to the crushed intermediate units. The sieve fractions of the crushed intermediate units are specified. The firing shrinkage here was, with 0.5%, very low, the open porosity high and, therefore, the spalling resistance very high. Owing to the relatively small proportion of only 10% chromium oxide as reactive component, there also resulted a comparatively coarse bridging with a cold compression strength of only 70 MPa.

In embodiment example No. 2 the proportion of fine sieve fractions was, with 25%, comparatively low, but the proportion of non-fired chromium oxide was 19% and, in addition, 1% of titanium oxide was added so that these two reactive materials were present in a comparatively high proportion. Although the firing shrinkage is the highest among the given examles, it is, however, still lower than with the state-of-the-art. There results a comparatively better cold compression strength, while the spalling resistance is comparatively poor but, however, still considerably better than with dense chromium oxide bricks such as are employed in direct contact with glass.

The embodiment example reproduced above under No. 3 in the table lies in the middle range in that the reactive material makes up 15% of the total. A relatively high, coarse sieve fraction of crushed intermediate units is applied here so that the open porosity climbs. The cold compression strength is, with 100 MPa, and the spalling resistance, with 8 chillings, are both relatively high.

In all the embodiment examples Nos. 1 to 3, 96% by weight chromium oxide and 4% by weight titanium oxide was employed for producing the intermediate units. The given sieved fractions then resulted from the crushing of these intermediate units.

Example No. 4 is a comparative example to set against the embodiment examples Nos. 1 to 3 according to the invention. This shows a single-stage firing technique for a dense brick in which the firing shrinkage, with 15%, is unacceptably high. This results in a particularly good cold compression strength but the spalling resistance is correspondingly low so that such bricks may only be heated up or, respectively, cooled down extremely slowly during production and in use.

I claim:

1. A method for producing a porous chromium oxide containing refractory brick having a firing shrinkage less than 1.0% comprising:
   (a) mixing chromium oxide and titanium oxide to form a first mixture having at least approximately 95% chromium oxide and approximately 5.0% titanium oxide;
   (b) molding and reductive firing the first mixture of chromium oxide and titanium oxide to form intermediate units of solid titanium oxide in the chromium oxide;
   (c) crushing the intermediate units to form sieve fractions;
   (d) mixing the sieve fractions with non-fired chromium oxide to form a second mixture; and
   (e) reductive firing the second mixture to form a porous refractory brick having a firing shrinkage less than 1.0% and containing chromium oxide.

2. The method of claim 1, further comprising the step of adding non-fired titanium oxide to the sieve fractions formed by the crushing of the intermediate units.

3. The method of claim 2, wherein said non-fired chromium oxide and said non-fired titanium oxide are approximately 10 to 20% by weight of said second mixture.

4. The method of claim 2, wherein said first mixture comprises approximately 96% by weight chromium oxide and approximately 4% by weight titanium oxide, and wherein said second mixture comprises approximately equal percentages by weight of said non-fired chromium oxide and said non-fired titanium oxide.

5. The method of claim 1, wherein said sieve fractions range in size from approximately 0.5 mm. to 4.0 mm.

6. The method of claim 1, wherein approximately 15 to 30% by weight of said sieve fractions range in size up to approximately 0.5 mm.

7. The method of claim 1, wherein approximately 15 to 30% by weight of said sieve fractions range in size from approximately 0.5 to 1.0 mm.

8. The method of claim 1, wherein approximately 20 to 60% by weight of said sieve fractions range in size from approximately 1.0 to 4.0 mm.

9. The method of claim 1, wherein said second mixture is fired under an oxidizing atmosphere during heat-up prior to said reductive-firing, and during cool-down after said reductive-firing.

10. The method of claim 9, wherein said intermediate units are formed by rollers.

11. A method for producing a refractory brick having a 10 to 20% open pore ratio and a firing shrinkage less than 1.0%, comprising;
    (a) mixing chromium oxide and titanium oxide to form a first mixture having at least 95% chromium oxide and up to approximately 5.0% titanium oxide;
    (b) molding and reductive firing the first mixture to form intermediate units of solid titanium oxide in the chromium oxide;
    (c) crushing the intermediate units to form sieve fractions;
    (d) mixing the sieve fractions with non-fired chromium oxide to form a second mixture; and
    (e) reductive firing the second mixture to form a refractory brick having a 18 to 20% open pore ratio and a firing shrinkage less than 1%.

* * * * *